UNITED STATES PATENT OFFICE.

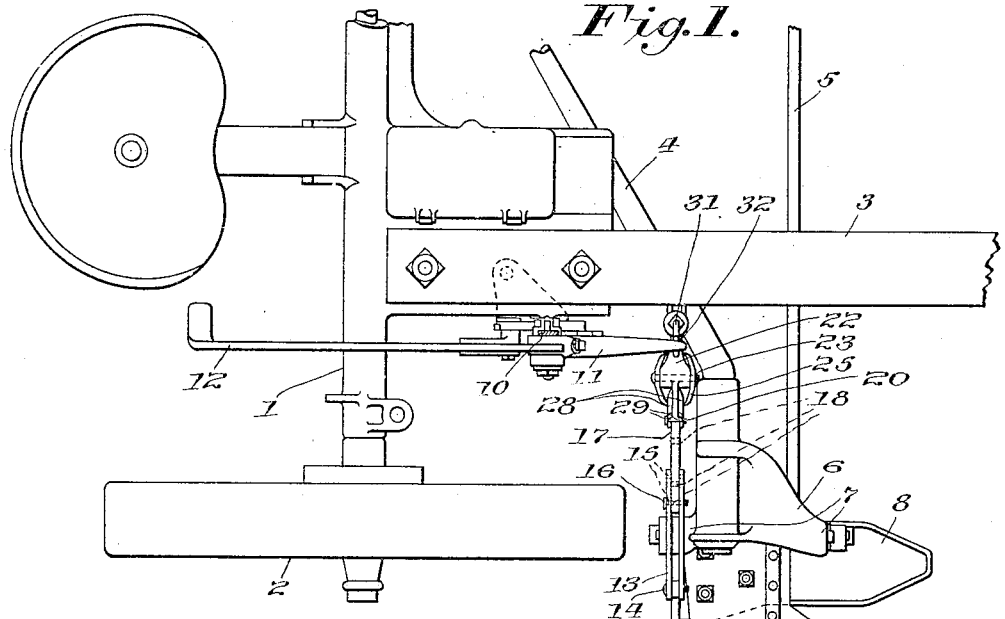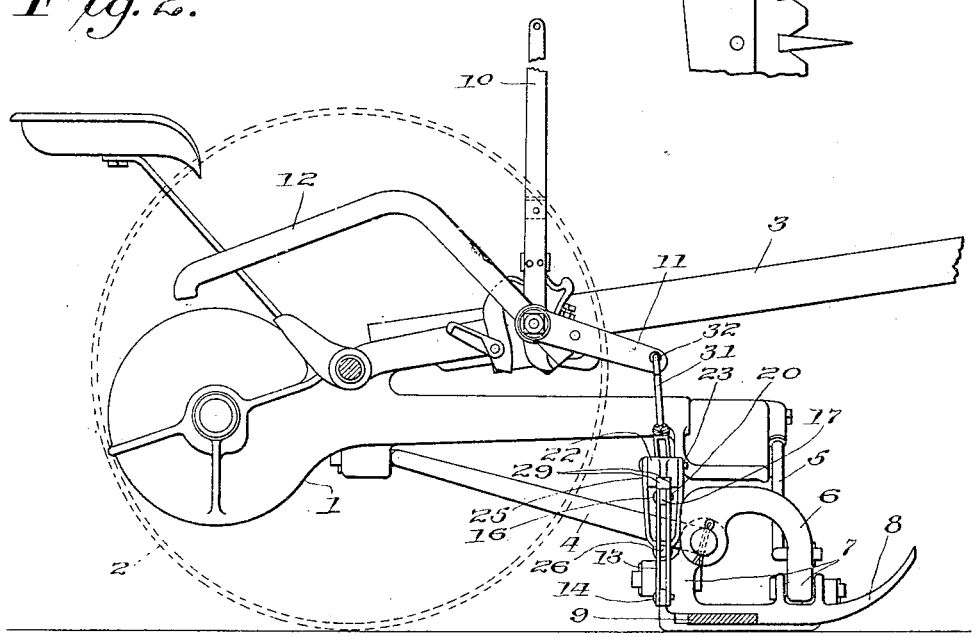

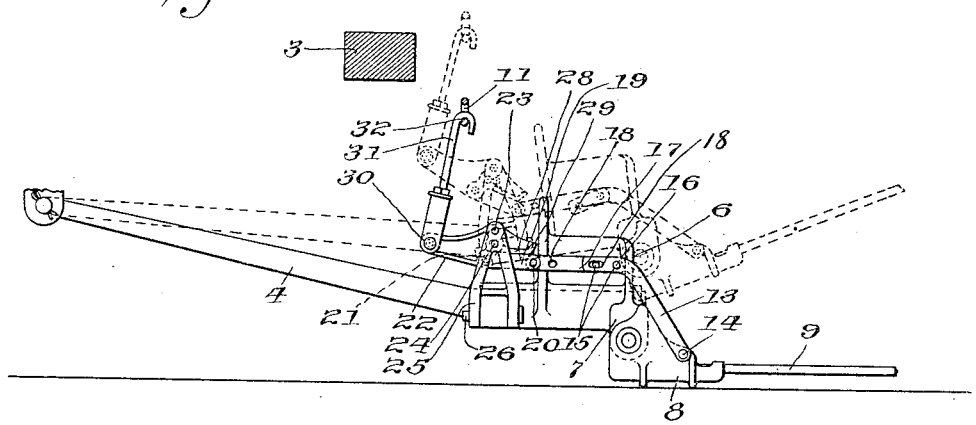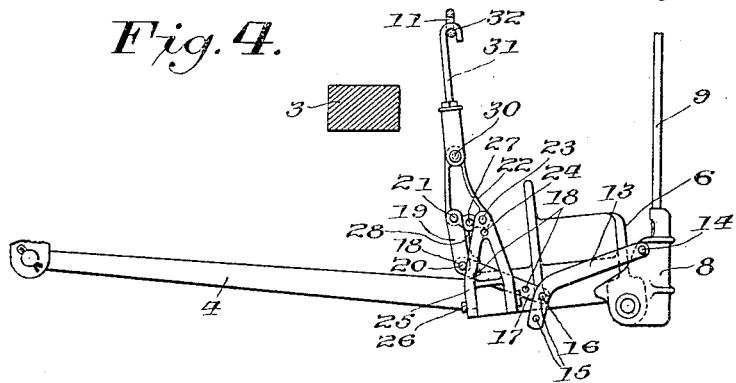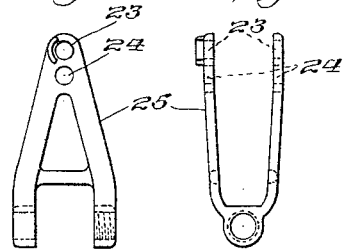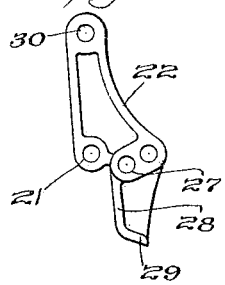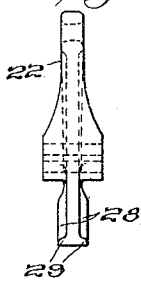

CHARLES PEARSON, OF CHICAGO, ILLINOIS, ASSIGNOR TO INTERNATIONAL HARVESTER COMPANY OF NEW JERSEY, A CORPORATION OF NEW JERSEY.

MOWING-MACHINE.

1,257,386.   Specification of Letters Patent.   Patented Feb. 26, 1918.

Application filed January 21, 1914. Serial No. 813,409.

*To all whom it may concern:*

Be it known that I, CHARLES PEARSON, a citizen of the United States, residing at Chicago, in the county of Cook and State of Illinois, have invented certain new and useful Improvements in Mowing-Machines, of which the following is a full, clear, and exact specification.

My invention relates to mowing machines. It has among its objects to increase the facility with which the finger bar of a mower may be moved from its horizontal or cutting position to its up or inoperative position. A further and more specific object of my invention is to improve the bar lifting mechanism of a vertical lift mower in such a manner that it may be operated with greater facility and at the same time have its flexibility materially increased, the same mechanism by a simple adjustment being adapted to use as a vertical or plain lift mechanism, or in connection with bars of different weight. I attain these objects by providing improved adjustable operative connections between the operating lever and finger bar whereby, among other features, as the lever is operated to raise the bar, the leverage developed is automatically varied in such a manner as to give maximum leverage and speed during the desired intervals, and this leverage is rendered adjustable in such a manner as to make the device readily adaptable to the varying conditions encountered in service.

In order that my invention may be clearly and fully disclosed, I have illustrated one embodiment of the same in the accompanying drawings applied to a vertical lift mower of the general type described and claimed in my copending application, Serial No. 744,537, filed January 27, 1913, over which this application covers an improvement.

Figure 1 is a top plan view of part of a mowing machine equipped with my improvement.

Fig. 2 is a side elevation of Fig. 1.

Fig. 3 is a rear view of the coupling frame and finger bar and illustrating the operation of the gag lever mechanism connecting the hand lever with the finger bar.

Fig. 4 is a view similar to Fig. 3 and showing the finger bar raised to a vertical position.

Fig. 5 is a rear view of a swinging fulcrum member forming a part of the finger bar adjusting mechanism.

Fig. 6 is a side elevation of Fig. 5.

Fig. 7 is a rear view of the gag lever that forms part of the finger bar adjusting means.

Fig. 8 is a side elevation of Fig. 7.

The mowing machine shown comprises, when broadly considered, a wheeled frame 1 mounted on carrying wheels 2 and having a draft tongue 3, a main coupling bar 4, a supplemental coupling bar 5, a rocking coupling yoke 6 carried by the grassward end of the main coupling bar and having depending arms 7 whereby it is pivotally connected with a shoe 8, a finger bar 9 secured to the shoe, a hand lever 10 mounted upon the wheeled frame 1 having a forwardly extending arm 11, and a foot lever 12 connected with the hand lever in the usual manner.

Operatively connected between the levers 10 and 12 and the finger bar 9 is my improved lifting mechanism for the latter. As shown, a transversely and upwardly disposed swinging gag lever member 13 of spaced link construction is pivoted at 14 to the shoe 8 and normally rests against an abutment thereon. This member 13 is provided with a stubblewardly extending end disposed at an angle to its body portion and having a plurality of openings 15 therein through one of which a suitable connecting pin 16 extends to connect the same to the grassward end of a second transversely extending and normally horizontal link 17 likewise having a plurality of openings 18 in its grassward end. The stubbleward end of this link 17 is pivoted in turn to a third and shorter normally horizontal, transversely extending link 19 at 20, the link 17, as shown, being also provided at its stubbleward end with a plurality of pivot holes 18, so that it may be reversible and thereby facilitate assembly of the parts. The link 19, to which the link 17 is pivoted, is also of spaced link construction and is in turn pivoted at its stubbleward end at 21 to the under side of a transversely disposed gag lever 22 at a point substantially half way between the ends of the latter. As shown, this gag lever 22 is pivoted at 23 at a point above and at the grassward side of the pivot 21 in one or the other of a vertically arranged series of openings 24 in the arms of an upstanding bracket 25, carried by the coupling yoke 6 and pivotally attached to a rearwardly extending lug thereon by a transversely extending bolt 26. The gag lever is also provided with an additional pivot hole 27 disposed beneath the pivot 23 and slightly at the grassward side thereof, also adapted to receive the pivot pin 23. It is thus seen that not only may the leverage of the links be adjusted by varying their length through the adjustment of the pin 16 in such a manner as to adapt the lifting mechanism to use as either a plain or vertical lift device, but that the gag lever itself may be adjusted to vary the leverage either by adjustment with respect to a given set of holes in the bracket, or in any one of the sets of holes therein (Figs. 7 and 8). It is also to be noted that the gag lever 22 is provided with an elongated longitudinally disposed cut-away portion on its under side extending from a point beneath its pivot to its grassward end, and has also a pair of laterally extending oppositely disposed flanges 28 on its sides at points above this cutaway portion. These flanges engage the upper edges of the links 19 and are provided with angularly disposed extensions 29 (Fig. 7), so disposed as to limit the movement of the link 17 when this link reaches the position relative thereto shown in Fig. 4 and before the bar reaches its vertical position. In the form shown herein the long or stubbleward end of this gag lever 22 is pivotally connected at 30 to a longitudinally adjustable link 31, which in turn has its upper end pivoted at 32 to the end of the arm 11 on the hand lever 10.

The operation of the embodiment of my invention shown herein will now be described. The horizontal or cutting position of the bar is shown in full lines in Fig. 3, while the vertical or inoperative position of the same is shown in Fig. 4. In lifting the bar from its horizontal to its vertical position, the pin 16 is adjusted in the grassward hole 15 of the link 13 and in the grassward hole 18 in the grassward end of the link 17. Then the hand lever 10 is pulled backward about its pivot from the forward position shown in Fig. 2. During the first stages of this backward movement of the lever 10, the depending link 31 pivoted to the arm 11 is raised and the gag lever 22 is rocked about its pivot 23 toward the position indicated in dotted lines in Fig. 3. During this moment, i. e., while the lever is moving through the first stages of its movement and the operator is able to exert a straight arm pull on the same and thus use his strength to the best advantage, the grassward end of the bar is lifted and the coupling frame is slowly raised bodily to its usual limit of movement in vertical lift devices, indicated in dotted lines in Fig. 3, a great leverage being exerted at this time by the gag lever upon the link connections 13, 17 through the downward movement of the short flanged end of the gag lever against the links 19. This leverage continues while the power required to lift the bar is at its maximum, i. e., until the latter passes beyond its dotted line position shown in Fig. 3. Shortly after this point is passed, however, as the work required to be done decreases as the gag lever 22 is rocked still further about its pivot 23 toward the full line position shown in Fig. 4, the leverage of the gag lever is automatically decreased and the speed of the bar is correspondingly increased. This is due to the rigid connection of the link 17 to the gag lever, the angularly disposed end 29 of the flange 28 on that lever then engaging the upper end of the link 17 and rigidly positioning the latter with respect to the gag lever so that during the remaining downward movement of the latter and backward movement of the hand lever, the link 17 constitutes in effect a part of the gag lever, and, since it moves through a larger arc in a given time, therefore necessarily throws the member 13 and the finger bar to the full line positions indicated in Fig. 4 at an increased speed. Obviously, as the hand lever 10 is moved in the opposite or lowering direction, the gag lever 22 will be rocked in the opposite direction and will, as it swing about its pivot, permit the links 19 and 17 to straighten gradually and the member 13 and bar to move to the position shown in full lines in Fig. 3, the coupling frame being held up until after the bar reaches an operative angle with respect to the ground, through the holding action of the gag lever and link 31. In this connection it is, of course, to be understood that the operator may, if desired, use the foot lever 12 in the usual way, either to start the parts in operation or assist in the lifting movement. When it is desired to use the device as a plain lift mechanism, the leverage of the link 13 upon the abutment on the shoe 8 is changed in such a manner as to adapt the device to use as a plain lift. This is accomplished by simple adjustment of the pin 16, which, instead of being placed as shown in Figs. 3 and 4 and described above in connection with the use of the device as a vertical lift mechanism, it passes through the stubbleward hole 15 in the link 13 and the stubbleward hole in the pair of openings 18 at the grassward end of the link 17, the coupling frame, of course, being permitted to rise freely in the usual manner.

It is to be noted that in this construction the operating lever may be pulled back at the desired constant speed, the leverage of the gag lever grassward of its axis being varied in a step by step manner in accordance with the work to be done in such a manner that it is at its maximum while the greatest lifting is being done and then decreases as the work to be done decreases. This maximum lifting effect, it is to be noted, also occurs while the hand lever is in forward position and moving through that portion of its travel where the operator is able to exert the greatest power thereon with the least effort. Attention is also directed to the fact that the movement of the parts is speeded up after this period of maximum lifting is passed, in such a manner that a sufficient inward impetus is given the bar to throw it through the ordinarily difficult last stages of its movement and into its absolute vertical position without requiring any straining pull on the part of the operator. Attention is further directed to the fact that due to the adjustments provided for the pivots of the gag lever and the connecting links, I am able to vary the leverage developed as desired, to adapt the device to use as either a plain or vertical lift mechanism, and to accommodate bars of different lengths, increasing or decreasing the leverage developed as the weight of the bar requires. It is also to be noted that a connection is provided between the bar and the gag lever which normally acts to hold the bar in its cutting position and is automatically flexed by the gag lever as the bar is raised into such a position as to hold the bar in its up position.

While I have in this application illustrated one embodiment which my invention may assume in practice, it is, of course, to be understood that the form described herein is shown only for purposes of illustration and may be modified without departing from the spirit of my invention.

What I claim as my invention and desire to secure by Letters Patent is:

1. In a mowing machine, a main frame, a coupling frame pivotally mounted thereon, a finger bar pivoted on said coupling frame, an operating lever pivoted on said main frame, a gag lever adjustably pivoted on said coupling frame, and adjustable link connections between said gag lever and finger bar and between said gag lever and operating lever whereby the mechanism will operate as a plain or vertical lift device.

2. In a mowing machine, a main frame, a lifting lever pivoted thereon, a coupling frame pivoted to said main frame, a finger bar pivoted on said coupling frame, a bracket pivoted to said coupling frame, a gag lever adjustably pivoted at a point intermediate its ends to said bracket, and means operatively connecting said gag member with said lever and with said finger bar.

3. In a mowing machine, a main frame, a coupling frame pivoted thereon, a finger bar pivoted to said coupling frame, an operating lever pivoted on said main frame, a gag member adjustably pivoted to said coupling frame, adjustable operating connections between said gag member and finger bar, and connections between said gag member and lever whereby the mechanism may be used when in one position of adjustment as a plain lift device and when in another position of adjustment as a vertical lift device.

4. In a mowing machine, a main frame, a coupling frame pivoted thereon, an operating lever pivoted on said main frame, a gag member operatively connected to said lever and provided intermediate its ends with a plurality of spaced apertures, a bracket pivoted to said coupling frame and provided at its upper end with a plurality of spaced apertures adapted to register with the apertures in said gag member whereby a pivot pin may be secured in one of the apertures of said bracket and pass through one of the apertures of said gag member, and means for connecting said gag member to the finger bar.

5. A mowing machine including, in combination, a wheeled frame, a rising and falling coupling frame, a finger bar pivotally connected with said coupling frame, a finger bar adjusting lever mounted upon said wheeled frame, a gag lever pivoted intermediate its ends on said coupling frame parallel with said finger bar, a link having one end pivotally connected with said gag lever adjacent its axis and its opposite end with one end of a second link operatively connected with said finger bar, said gag lever engaging with said links successively to vary its effective leverage in a step by step manner, and operative connections between said finger bar adjusting lever and said gag lever.

6. A mowing machine including, in combination, a wheeled frame, a rising and falling coupling frame, a finger bar pivotally connected with said coupling frame, a finger bar adjusting lever mounted upon said wheeled frame, a gag lever pivoted intermediate its ends on said coupling frame parallel with said finger bar, a second gag lever having one end pivotally connected with said finger bar, a link having one end pivotally connected with said first gag lever adjacent its axis and its opposite end with one end of a second link having its opposite end pivotally connected with the free end of said second gag lever, said first gag lever engaging with said links successively to vary its effective leverage in a step by step manner, and operative connections between said finger bar adjusting lever and said first gag lever.

7. In a mowing machine, a main frame, a coupling frame pivotally mounted thereon, a finger bar pivotally connected to said coupling frame, a bracket carried on said coupling frame, a transversely disposed gag lever adjustably pivoted at a point intermediate its ends to said bracket, said gag lever having on its grassward end a longitudinally disposed flange provided with an angularly extending portion at its grassward end, said flange extending substantially half way along said gag lever, a link pivoted to said gag lever adjacent the stubbleward end of said flange and engageable with the body portion of the latter, a second link pivoted to said first link adjacent the opposite end of said flange and engageable with the angularly disposed portion thereof, a third link pivotally connected to said second link and extending grasswardly and downwardly therefrom, said third link being pivotally connected to said finger bar, an operating lever pivoted on said main frame, and operative connections between said lever and the stubbleward end of said lever.

8. In a mowing machine, a main frame, a coupling frame pivotally mounted thereon, a finger bar pivotally connected to said coupling frame, a bracket carried on said coupling frame, a transversely disposed gag lever adjustably pivoted at a point intermediate its ends to said bracket, said gag lever having on its grassward end a longitudinally disposed flange provided with an angularly extending portion at its grassward end, said flange extending substantially half way along said gag lever, a link pivoted to said gag lever adjacent the stubbleward end of said flange and engageable with the body portion of the latter, a second link pivoted to said first link adjacent the opposite end of said flange and engageable with the angularly disposed portion thereof, a third link pivotally connected to said second link extending grasswardly and downwardly therefrom, said third link being connected to said finger bar, an operating lever pivoted on said main frame, adjustable link connections between said lever and the stubbleward end of said gag lever, and means for varying the effective length of the links connecting said gag lever and finger bar.

In testimony whereof I affix my signature in the presence of two witnesses.

CHARLES PEARSON.

Witnesses:
 R. W. MARTIN,
 RAY PATTISON.

Copies of this patent may be obtained for five cents each, by addressing the "Commissioner of Patents, Washington, D. C."